Patented July 6, 1937

2,085,828

UNITED STATES PATENT OFFICE 2,085,828

BOILER WATER TREATMENT

Cyrus W. Rice, Pittsburgh, Pa.

No Drawing. Application November 6, 1935,
Serial No. 48,553

7 Claims. (Cl. 210—23)

This invention relates to the conditioning of boiler water, and to a preparation for use in boiler water conditioning.

One object of my invention is to provide in prepared form a composition which by simple preliminary reaction provides a complete conditioning composition for boiler water.

Another object of my invention is to provide a preparation of such nature that the preliminary reaction, conducted to prepare the composition for use, is caused to proceed slowly and with an approximation to uniformity; and proceeds without any marked temperature surge, such as would necessitate the employment of heat-abstracting equipment, thus rendering the composition suitable for use in the field by operators of steam-generating installations.

Another object of the invention is to provide a preparation of phosphoric acid and a colloid producing material in which there is present in the mixture, additionally to the phosphoric acid and the colloid producing material themselves, a product of reaction between the phosphoric acid and the colloid producing material which constitutes in itself a conditioning reagent for the boiler water.

In making up my preparation, I take orthophosphoric acid ($H_3PO_4$) and to this add a suitable, preferably starchy colloid, which is desirably in powdered form. I have found suitable for incorporation in my prepared conditioning composition, colloid-producing materials such as tapioca starch, soy bean starch, corn starch, and similar starches. Of the starchy materials, I prefer tapioca starch, as I have found this material specifically to be most reactive with the phosphoric acid to produce a reaction product of the phosphoric acid and the starch.

As is well known, orthophosphoric acid ($H_3PO_4$) exists as a liquid, and occurs in aqueous solution. Desirably, I commingle the water solution of the phosphoric acid with the starchy colloid-producing material, the latter being in powdered or otherwise divided form. As so commingled, optimum proportions are approximately 10 parts by weight of the acid (based on 100% $H_3PO_4$) to each part of the starch of the nature of those specified which is reactive with phosphoric acid.

The mixture formed as above may be packed in drums, for shipping, or it may, if desired, be diluted with water before introduction into the containers. Desirably, the preparation is permitted to remain in its most concentrated form in order that its bulk may be minimized for shipment.

I have found that there is reaction between the orthophosphoric acid and the colloidal material, resulting in the production of an ester of the starch. While I am unable to give the reaction involved between the phosphoric acid and the colloid-producing material, its presence, however, is clearly indicated.

While the reaction between phosphoric acid and the starch may be expedited by agitation, and gentle heating at a temperature below 212° F., I have found that the reaction takes place by a simple admixture of the ingredients.

I thus have, as a preparation in condition for shipment and use in the field, an aqueous mixture of phosphoric acid and starchy colloid-producing material, together with a product of reaction between the phosphoric acid and the colloid-producing material. This mixture is sold by me as a material of commerce.

It is generally desirable to add to the preparation of orthophosphoric acid and starch a small quantity of aluminum hydroxide, for the purpose of maintaining the viscosity of the preparation. If added, the addition of the aluminum hydroxide should be made after the maximum of reaction between the phosphoric and starchy colloid has occurred. If sooner added, the aluminum hyroxide would tend to inhibit the reaction by which the ester is formed.

As a preliminary to use of the preparation, it is reacted with an alkaline reagent capable of forming water-soluble phosphates by reaction with phosphoric acid, such as sodium hydroxide, potassium hydroxide, or sodium carbonate. This is in order to convert the free phosphoric acid contained in the mixture to an orthophosphate, or phosphates, and to effect peptization of the colloid-producing material into a true colloid.

Upon introduction into the boiler, the phosphate produced by reaction between the free phosphoric acid and the alkaline reagent reacts in well known manner with the calcium and magnesium salts constituting the hardness content of the boiler water. The colloidal content of the conditioning preparation produced by these reactions serves the known function of a colloid in a boiler by acting as an adsorbing agent. There is, however, an additional observed result which may properly be attributed to a colloidal reaction product formed by reaction between the phosphoric acid compound and the alkaline reagent.

In a boiler, a colloid has, of itself, the quality of promoting the formation of sludge, thus tending to reduce boiler encrustation. In adding to boiler water a conditioning agent formed by reacting my preparation with an alkali, I have observed that favorable boiler conditions are maintained by the presence of a substantially minimized $PO_4$ concentration for any given concentration of calcium and magnesium salts in the boiler water. As a typical example of the above, I have noted the following comparative test:

In a boiler having a noted concentration of calcium and magnesium salts in the boiler water, I added sodium orthophosphate in quantity calculated to give 20% excess of the $PO_4$ radical, and by test determined that such excess of the radical was present.

Adding, under identical conditions of use and identical hardness concentration, reacted "Phoscaloid" in quantity based upon $PO_4$ radical of the initial phosphoric acid content of the composition, I found by test a 70% excess of $PO_4$ radical in the boiler water.

The above test clearly indicates the presence of an active reagent, or agent, additional to the $PO_4$ radical itself. Clearly this reagent, or agent, is a colloid product which in activated condition is capable of limiting quantitatively the $PO_4$ radical necessary for precipitating the calcium and magnesium bases which combine in the formation of the most objectionable scale depositions. By "starchy" colloid-producing material I intend to embrace materials which are the equivalents of starch in producing true colloids when reacted in aqueous admixture with phosphoric acid and thereafter subjected to reaction with an alkali.

I claim as my invention:

1. The herein described method of conditioning boiler water which comprises commingling in aqueous admixture phosphoric acid and a colloid-producing starch reactive with the phosphoric acid in such manner and in such excess of phosphoric acid to starch as effectually to cause reaction between the phosphoric acid and the starch, adding to the aqueous reacted admixture an alkaline reagent capable of forming water-soluble phosphate by reaction with phosphoric acid, thereby to form phosphatic reaction products of true colloidal nature, and introducing the resultant products of reaction into a boiler.

2. The herein described method of conditioning boiler water which comprises commingling in aqueous admixture phosphoric acid and a tapioca starch reactive with the phosphoric acid in such manner as effectually to cause reaction between the phosphoric acid and the tapioca starch, adding to the aqueous reacted admixture an alkaline reagent capable of forming water-soluble phosphate by reaction with phosphoric acid, thereby to form phosphatic reaction products of true colloidal nature, and introducing the resultant products of reaction into a boiler.

3. A composition of matter prepared for boiler water conditioning comprising an aqueous admixture of phosphoric acid and colloid-producing starch reactive with phosphoric acid, in said admixture the phosphoric acid being in such excess with respect to the starch as effectually to react with the starch and the colloid-producing starch being in at least substantial proportion so modified by reaction with the phosphoric acid that it is susceptible of peptization to produce a true colloid by reaction with an alkaline reagent capable of forming water-soluble phosphates by reaction with phosphoric acid.

4. A composition of matter prepared for boiler-water conditioning comprising an aqueous admixture of phosphoric acid and tapioca starch reactive with phosphoric acid, in said admixture the tapioca starch being in at least substantial proportion so modified by reaction with the phosphoric acid that it is susceptible of peptization by reaction with an alkaline reagent capable of forming water-soluble phosphate by reaction with phosphoric acid to produce a true colloid.

5. The herein described method of producing a colloid-containing boiler-conditioning preparation which comprises commingling in aqueous admixture phosphoric acid and a colloid-producing starch reactive with the phosphoric acid in such manner and in such excess of phosphoric acid to starch as effectually to cause by reaction between the phosphoric acid and the starch a reaction product capable of forming a true colloid by reaction with an alkali, and adding to the reacted aqueous admixture of phosphoric acid and starch an alkaline reagent capable of forming with phosphoric acid water-soluble phosphates, thereby to produce reaction products comprising phosphatic colloid.

6. The herein described method of producing a colloid-containing boiler-conditioning preparation which comprises commingling in aqueous admixture phosphoric acid and tapioca starch reactive with the phosphoric acid in such manner as effectually to produce by reaction between the phosphoric acid and the tapioca starch a reaction product capable of forming a true colloid by reaction with an alkali, and adding to the reacted aqueous admixture of phosphoric acid and tapioca starch an alkaline reagent capable of forming with phosphoric acid water-soluble phosphates, thereby to produce reaction products comprising phosphatic colloid.

7. A boiler-water conditioning composition comprising true phosphatic aqueous colloid, which phosphatic colloid is the product of the reaction in aqueous admixture between phosphoric acid and a starch reactive with phosphoric acid with the phosphoric acid in such excess with respect to the starch as effectually to react with the starch of the aqueous admixture and of subsequent reaction between such aqueous admixture and an alkaline reagent capable of forming by reaction water-soluble phosphates.

CYRUS WM. RICE.